United States Patent
Liu et al.

(10) Patent No.: US 12,192,678 B2
(45) Date of Patent: Jan. 7, 2025

(54) DYNAMICALLY CONTROLLING FOREGROUND APPLICATIONS DURING SCREEN SHARING CONFERENCES

(71) Applicant: INTERNATIONAL BUSINESS MACHINES CORPORATION, Armonk, NY (US)

(72) Inventors: Jia Liu, Beijing (CN); Zhan Peng Huo, Beijing (CN); Qi Li, Beijing (CN); Yan Fei Qin, Beijing (CN); Lu Yan Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 18/047,775

(22) Filed: Oct. 19, 2022

(65) Prior Publication Data

US 2024/0137465 A1 Apr. 25, 2024
US 2024/0236270 A9 Jul. 11, 2024

(51) Int. Cl.
*H04N 7/15* (2006.01)
*G06F 3/14* (2006.01)
*H04L 12/18* (2006.01)

(52) U.S. Cl.
CPC .......... *H04N 7/152* (2013.01); *G06F 3/1454* (2013.01); *H04L 12/1822* (2013.01)

(58) Field of Classification Search
CPC .......... H04N 7/152; H04N 7/15; H04N 7/147; G06F 3/1454; H04L 12/1822
See application file for complete search history.

(56) References Cited

U.S. PATENT DOCUMENTS

| 9,996,367 B1 | 6/2018 | Bao et al. |
| 11,245,735 B1 | 2/2022 | Kwatra et al. |
| 2009/0172113 A1* | 7/2009 | Srikanth ................. H04L 51/00 709/206 |

FOREIGN PATENT DOCUMENTS

| CN | 103164654 B | 6/2013 |
| CN | 108108218 A | 6/2018 |

(Continued)

OTHER PUBLICATIONS

Anonymous, "A New Method to Control the Display Status of Message Based on the Analysis of User Message and Screen Status", ip.com, IPCOM000262295D, May 18, 2020, 3p.

(Continued)

*Primary Examiner* — Phung-Hoang J Nguyen
(74) *Attorney, Agent, or Firm* — Cantor Colburn LLP; Kelsey M. Skodje (57) ABSTRACT

A computer-implemented method for managing information during a web conference is provided. The computer-implemented method includes collecting and formatting meeting application information at a processor of a computing device having a screen being shared with attendees of the web conference and collecting and formatting to-be-popup application information at the processor. The computer-implemented method further includes analyzing, by the processor, an urgency of the to-be-popup application information and a correlation between the to-be-popup application information and the meeting application information and determining, by the processor, whether to share the to-be-popup application information with a user of the computing device and with the attendees based on results of the analyzing.

8 Claims, 8 Drawing Sheets

(56) References Cited

FOREIGN PATENT DOCUMENTS

| | | | |
|---|---|---|---|
| CN | 201711481155 | A | 6/2018 |
| CN | 110673910 | A | 1/2020 |
| CN | 111488190 | A | 3/2020 |
| CN | 111143019 | A | 5/2020 |
| CN | 201911422520 | A | 5/2020 |

OTHER PUBLICATIONS

Anonymous, "Contextual selective dynamic screen sharing with random apps within context", ip.com, IPCOM000262497D, Jun. 7, 2020, 5p.

* cited by examiner

DYNAMICALLY CONTROLLING FOREGROUND APPLICATIONS DURING SCREEN SHARING CONFERENCES

BACKGROUND

The present invention generally relates to screen sharing technologies, and more specifically, to a computer-implemented method of dynamically controlling foreground applications during screen sharing conferences.

Web conferencing is used as an umbrella term for various types of online conferencing and collaborative services including webinars (web seminars), webcasts, and web meetings. In general, web conferencing is made possible by Internet technologies. Services can allow real-time, point-to-point communications as well as multicast communications from one sender to many receivers. It offers data streams of text-based messages, voice and video chat to be shared simultaneously, across geographically dispersed locations. Applications for web conferencing include meetings, training events, lectures, or presentations from a web-connected computer to other web-connected computers.

SUMMARY

Embodiments of the present invention are directed to a computer-implemented method for managing information during a web conference. A non-limiting example of the computer-implemented method includes collecting and formatting meeting application information at a processor of a computing device having a screen being shared with attendees of the web conference and collecting and formatting to-be-popup application information at the processor. The computer-implemented method further includes analyzing, by the processor, an urgency of the to-be-popup application information and a correlation between the to-be-popup application information and the meeting application information and determining, by the processor, whether to share the to-be-popup application information with a user of the computing device and with the attendees based on results of the analyzing.

Embodiments of the invention further provide computer program products and computer systems having substantially the same features and technical benefits as the above-described computer-implemented methods.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Turning now to an overview of technologies that are more specifically relevant to aspects of the invention, progress of science and technology has led to great changes in people's office modes. Various companies are exploring free and flexible office modes, which cannot be separated from the support of convenient and efficient video conference software. Remote video conference is frequent at work, often requiring sharing of screens and file content.

Existing video conference applications typically allow speakers to share an entire screen or an application. When the entire screen is displayed, other non-conference-related and private messages also appear on the screen. However, when only some of an application is displayed, users are likely to miss important messages, which greatly degrades the user experience. For example, a user who is sharing his/her entire screen might have an email arrive with important but proprietary information that he/she would prefer the other people seeing the screen not to see. Conversely, a user who is sharing only a portion of his/her screen might miss an incoming urgent email that is otherwise displayed in a background application.

Thus, it is often the case that users of screen sharing applications for web conferencing cannot flexibly control the display of other content besides the content released. In addition, those users cannot flexibly select an area to be placed on the shared screen, nor can the users control the display of multiple windows within a same screen sharing application.

Turning now to an overview of the aspects of the invention, one or more embodiments of the invention address shortcomings of the above-described approach by providing a method of dynamically controlling foreground applications in a screen sharing application for a web conference.

The above-described aspects of the invention address the shortcomings of known approaches by providing a special data structure in a form of a base-model and a coms-model. An information collection and management module (ICMM) is provided to collect information of pre-popup windows and a current conference application, takes a snapshot of a currently shared screen and uses the snapshot to cover a whole window. A data analysis module (DAM) analyzes the information and produces a primary base-model for subsequent usage. The DAM uses data formatting, urgency analysis and correlation analysis to generate the primary base-model. A sharing granularity control module (SGCM) analyzes the base-model to produce a coms-model for subsequent usage. The SGCM finds hyperplanes between not-to-be-shared popup windows and the shared information of the current conference application. With proper hyperplanes determined, an optimal combination of to-be-popup applications and the current conference application with a designated sharing granularity will be produced to form a coms-model for subsequent usage. A scheduler and management module (SMM) triggers a switching process of granularity by maintaining the coms-model to schedule and manage the current conference application to adjust the sharing granularity and by taking advantage of "state" attributes in the corns-model to change back to original sharing granularity after related popup messages are closed automatically or by the presenter.

Figure 1:
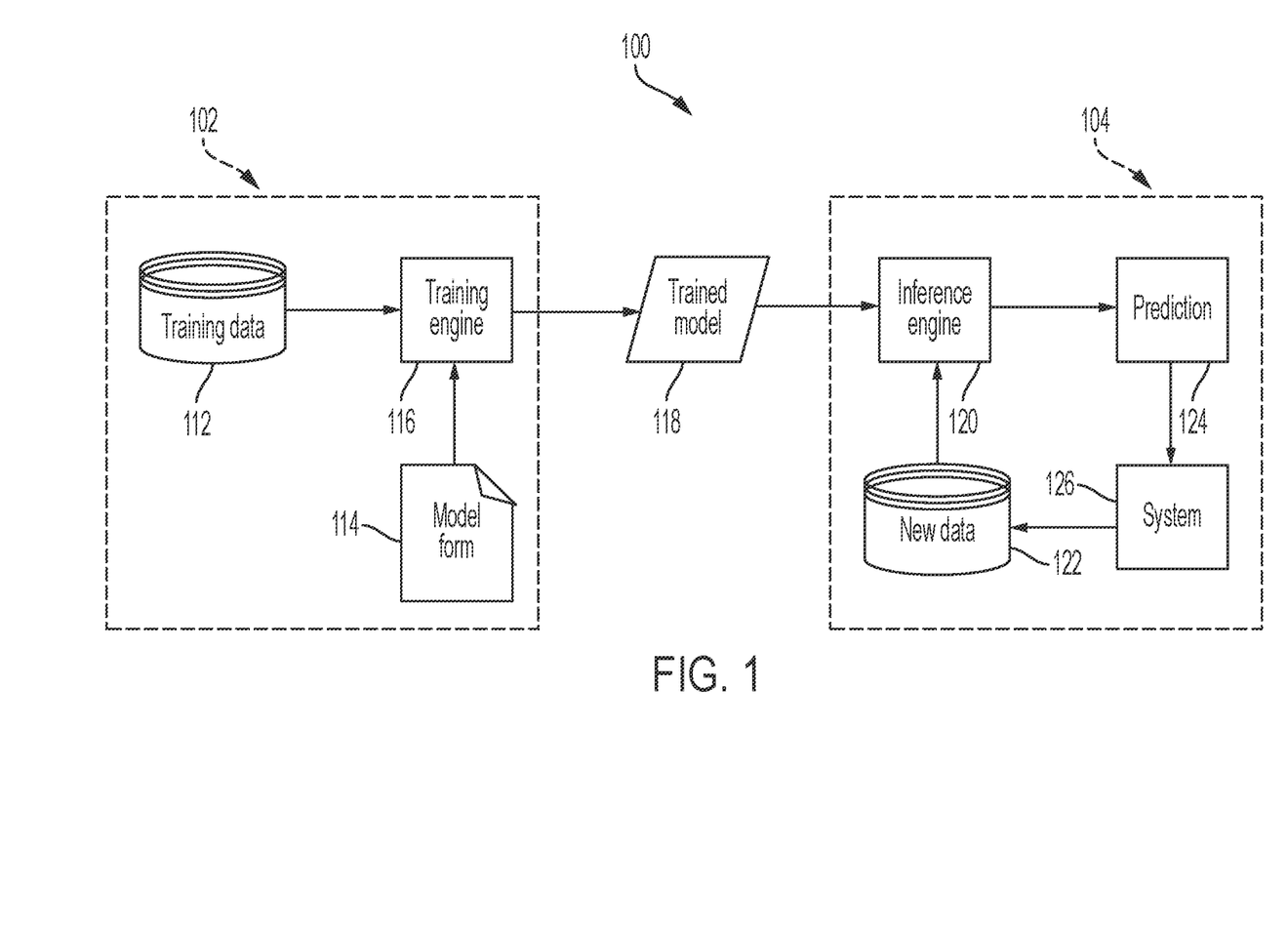
FIG. 1 is a block diagram of components of a machine learning training and inference system according to one or more embodiments of the present invention.

Turning now to a more detailed description of aspects of the present invention, FIG. 1 depicts a block diagram of components of a machine learning training and inference system 100. The machine learning training and inference system 100, in accordance with one or more embodiments of the invention, can utilize machine learning techniques to perform tasks, such as managing information during a web conference. More specifically, one or more embodiments of the invention described herein can incorporate and utilize rule-based decision making and artificial intelligence (AI) reasoning to accomplish the various operations described herein, namely collecting and formatting meeting application information at a processor of a computing device having a screen being shared with attendees of the web conference and collecting and formatting to-be-popup application information at the processor as well as analyzing, by the processor, an urgency of the to-be-popup application information and a correlation between the to-be-popup application information and the meeting application information and determining, by the processor, whether to share the to-be-popup application information with a user of the computing device and with the attendees based on results of the analyzing.

The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information during a web conference, for example. In one or more embodiments of the invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

The machine learning training and inference system 100 performs training 102 and inference 104. During training 102, a training engine 116 trains a model (e.g., the trained model 118) to perform a task. Inference 104 is the process of implementing the trained model 118 to perform the task in the context of a larger system (e.g., a system 126).

The training 102 begins with training data 112, which can be structured or unstructured data. The training engine 116 receives the training data 112 and a model form 114. The model form 114 represents a base model that is untrained. The model form 114 can have preset weights and biases, which can be adjusted during training. It should be appreciated that the model form 114 can be selected from many different model forms depending on the task to be performed. For example, where the training 102 is to train a model to perform image classification, the model form 114 can be a model form of a CNN (convolutional neural network). The training 102 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 112 includes labeled images, including images of the object of interest with associated labels (ground truth) and other images that do not include the object of interest with associated labels. In this example, the training engine 116 takes as input a training image from the training data 112, makes a prediction for classifying the image, and compares the prediction to the known label. The training engine 116 then adjusts weights and/or biases of the model based on results of the comparison, such as by using backpropagation. The training 102 can be performed multiple times (referred to as "epochs") until a suitable model is trained (e.g., the trained model 118).

Once trained, the trained model 118 can be used to perform inference 104 to perform a task. The inference engine 120 applies the trained model 118 to new data 122 (e.g., real-world, non-training data). For example, if the trained model 118 is trained to classify images of a particular object, such as a chair, the new data 122 can be an image of a chair that was not part of the training data 112. In this way, the new data 122 represents data to which the model 118 has not been exposed. The inference engine 120 makes a prediction 124 (e.g., a classification of an object in an image of the new data 122) and passes the prediction 124 to the system 126. The system 126 can, based on the prediction 124, taken an action, perform an operation, perform an analysis, and/or the like, including combinations and/or multiples thereof. In some embodiments of the invention, the system 126 can add to and/or modify the new data 122 based on the prediction 124.

In accordance with one or more embodiments of the invention, the predictions 124 generated by the inference engine 120 are periodically monitored and verified to ensure that the inference engine 120 is operating as expected. Based on the verification, additional training 102 can occur using the trained model 118 as the starting point. The additional training 102 can include all or a subset of the original training data 112 and/or new training data 112. In accordance with one or more embodiments of the invention, the training 102 includes updating the trained model 118 to account for changes in expected input data.

Figure 2:
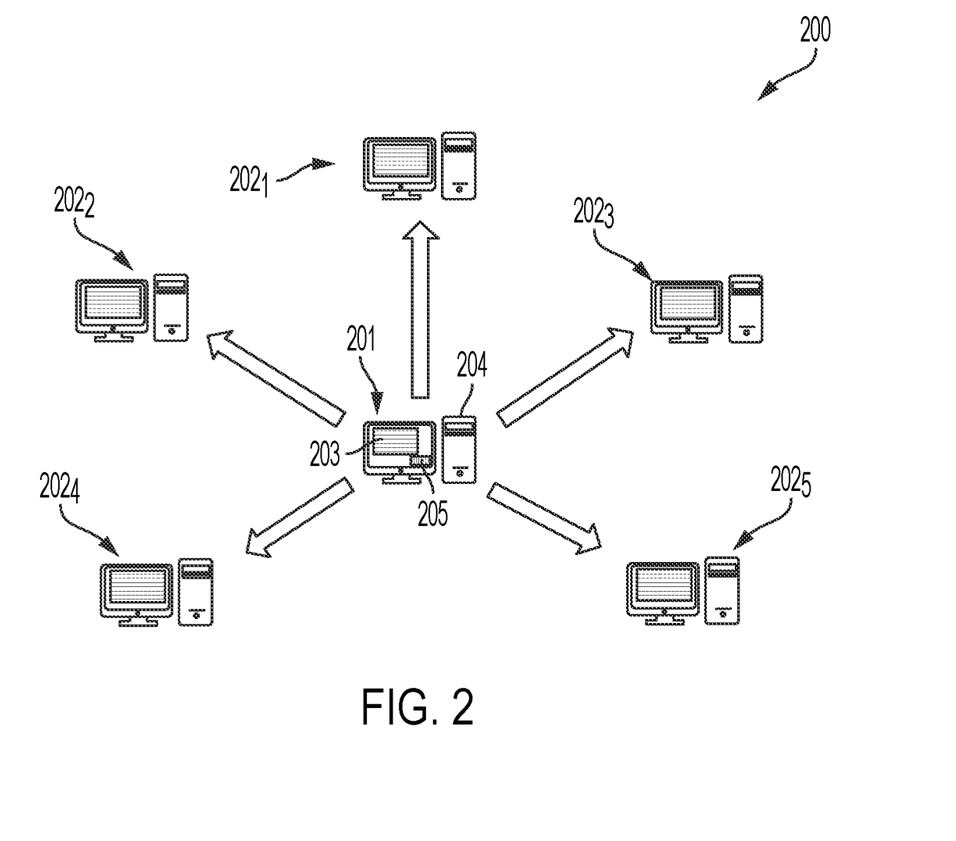
FIG. 2 is a schematic diagram of a web conference in which a screen of a computing device is being shared with other computing devices in accordance with one or more embodiments of the present invention.
Figure 3:
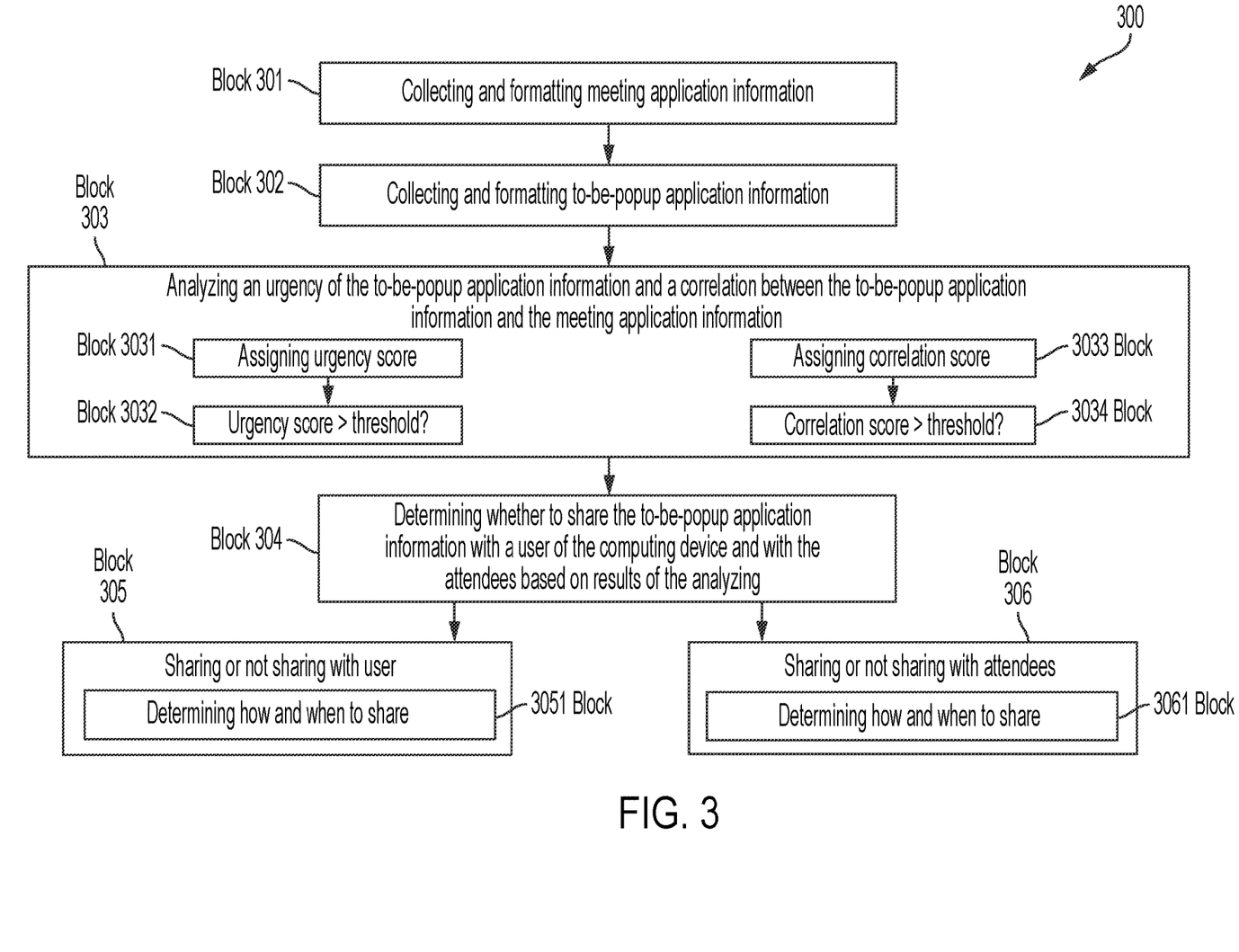
FIG. 3 is a flow diagram illustrating a computer-implemented method for managing information during a web conference in accordance with one or more embodiments of the present invention.

With reference to FIGS. 2 and 3, a computer-implemented method 300 (see FIG. 3) is provided for managing information during a web conference 200 in which a computing device 201, which is used by a user, is engaged in a web conference with other computing devices $202_{1-5}$, which are used by other users, and in which the computing device 201 shares its screen 203 with the other computing devices $202_{1-5}$. It will be understood that, during this web conference 200, a message of any type with certain information is delivered to the computing device 201 and, as such, several decisions need to be made. These include, for example, but are not limited to, whether to allow a popup window displaying that message to appear on the screen 203 of the computing device 201 and, if so, whether to display that message in such a way as to effectively share the message with the other computing devices $202_{1-5}$.

Thus, as shown in FIG. 3, the computer-implemented method 300 includes collecting and formatting meeting application information at a processor 204 (see FIG. 2) of the computing device 201 having the screen 203 being shared with attendees (i.e., the users of the other computing devices $202_{1-5}$) of the web conference 200 at block 301 and collecting and formatting to-be-popup application information related to the message at the processor 204 at block 302. In addition, the computer-implemented method 300 includes analyzing, by the processor 204, an urgency of the to-be-popup application information and a correlation between the to-be-popup application information and the meeting application information at block 303 and determining, by the processor 204, whether to share the to-be-popup application information with the user of the computing device 201 and with the attendees associated with the other computing devices $202_{1-5}$ based on results of the analyzing at block 304. The computer-implemented method 300 can also include sharing or not sharing the to-be-popup application information with the user of the computing device in accordance with results of the determining at block 305, which includes determining how and when to share the to-be-popup application information with the user of the computing device at block 3051, and sharing or not sharing the to-be-popup application information with the attendees in accordance with results of the determining at block 306, which includes determining how and when to share the to-be-popup application information with the attendees at block 3061.

In accordance with embodiments, the analyzing of the urgency at bock 303 can include assigning an urgency score to the to-be-popup application information, which describes the urgency thereof, at block 3031, and determining whether the urgency score exceeds a historically set and dynamically updatable urgency threshold at block 3032. In addition, the analyzing of the correlation at block 303 can include assigning a correlation score to the to-be-popup application information, which describes the correlation between the to-be-popup application information and the meeting application information, at block 3033, and determining whether the correlation score exceeds a historically set and dynamically updatable correlation threshold at block 3034.

In an exemplary case of an execution of the computer-implemented method 300 during the web conference 200 of FIGS. 3 and 2, respectively, the user of the computing device 201 might receive one or more of the following messages in a to-be-popup application running on the computing device 201 during the web conference 200: (1) a targeted advertisement, (2) a message from a family member about picking up kids, (3) a message from one of the other users of computing devices $202_{1-5}$ about changing a meeting time of the same group next week and (4) a substantive message from one of the other users of computing devices $202_{1-5}$ about a topic that is being discussed during the web conference 200.

For message (1), the targeted advertisement might have low urgency and correlation scores. As such, while it may be displayed to the user of the computing device 201, it need not be shared with the other users of computing devices $202_{1-5}$. Thus, to the extent that the targeted advertisement is to be shared with the user of the computing device 201, the targeted advertisement need not be shared immediately via the computing device 201 lest it be a distraction. In this case, the targeted advertisement can be shared with the user of the computing device 201 as an email that he/she can review later or via his/her phone without need for changing a sharing granularity of the web conference 200.

For message (2), the message from the family member might have a high urgency score and a low correlation score. As such, while it may be displayed to the user of the computing device 201, it need not be shared with the other users of computing devices $202_{1-5}$. Thus, to the extent that the message from the family member is shared with the user of the computing device 201, the message from the family member should be shared immediately despite the possibility of the message being a distraction. In this case, a sharing granularity of the web conference 200 will need to be changed so that the message from the family member can be shared with the user of the computing device 201 via a popup window 205 (see FIG. 2) that appears on the display unit of the computing device 201 outside of the screen 203 being shared.

For message (3), the message about the meeting time might have a low urgency score and a high correlation score. As such, while it may need to be displayed to the user of the computing device 201 and the other users of computing devices $202_{1-5}$, the message about the meeting time need not be shared immediately via the computing device 201 lest it be a distraction. In this case, the message about the meeting time can be shared with the user of the computing device 201 and the other users of computing devices $202_{1-5}$ as a group email that each person can review later or via each person's phone without need for changing a sharing granularity of the web conference 200.

For message (4), the substantive message might have high urgency and correlation scores. As such, it may need to be displayed immediately to the user of the computing device 201 and the other users of computing devices $202_{1-5}$. Thus, the substantive message can be displayed in a popup window within the screen 203 of the computing device 201 that is being shared. In this case, a sharing granularity of the web conference 200 will not need to be changed.

Through an execution of the computer-implemented method, users can flexibly control a display of content besides content being shared with other web conferees (i.e., attendees). Without sacrificing privacy or a quality of user experience, the users can flexibly select an area for sharing or accessing content on a screen and can flexibly control displays of multiple windows within a same application and/or within multiple applications.

Figure 4:
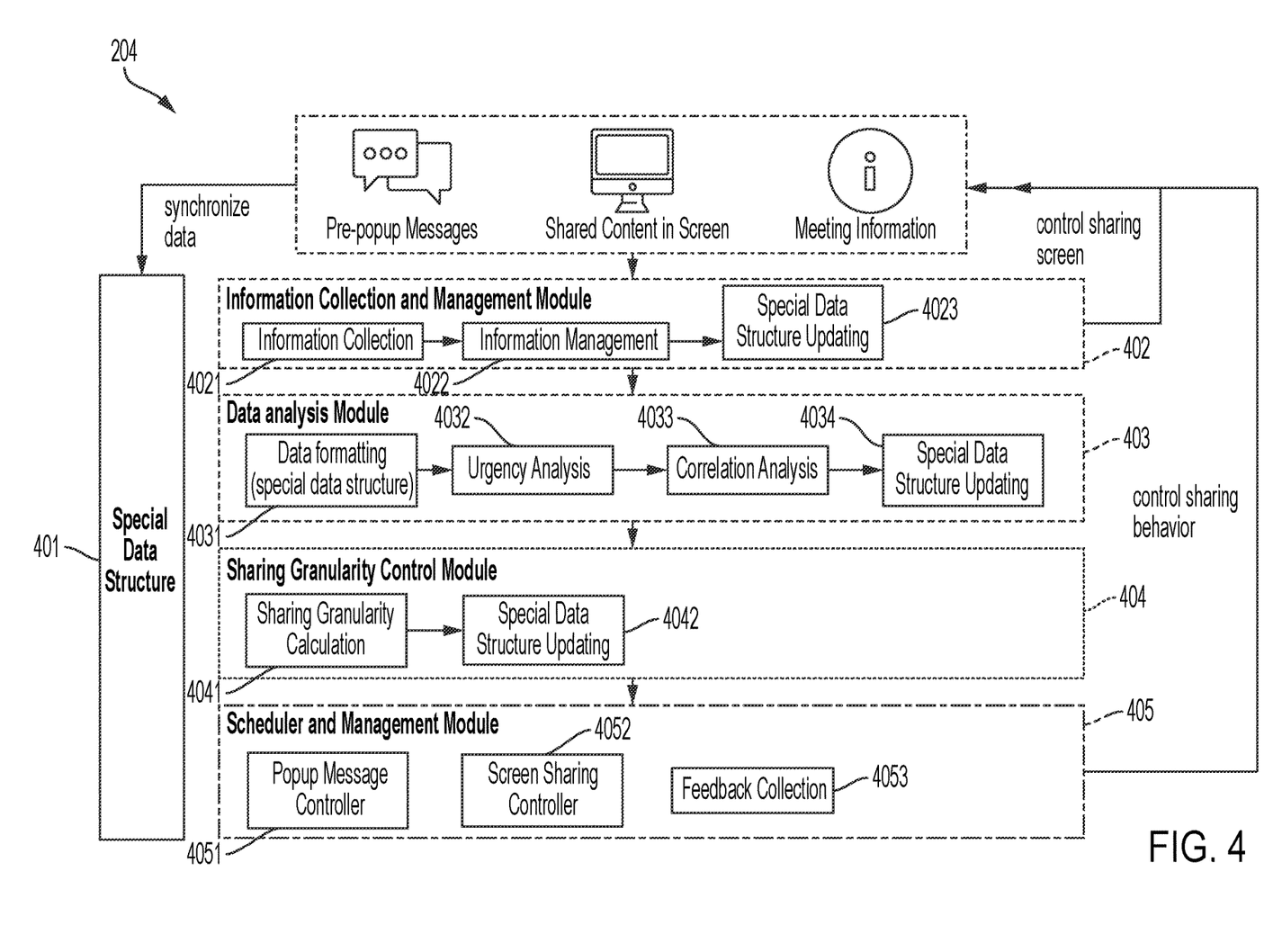
FIG. 4 is a schematic illustration of components of the computing device of FIG. 2 for executing the computer-implemented method of FIG. 3 in accordance with one or more embodiments of the present invention.

With reference to FIG. 4, the computer-implemented method 300 provided for managing information during the web conference 200 of FIGS. 3 and 2, respectively, provides a special data structure 401 in a form of a base-model and a coms-model. Coding of the base-model and the coms-model can be as follows:

```
BaseModel:{
  meetingApp:{ ShareGran: { Type: Area {value: areaValue} };
                           Type: Object {value: objectValue} };
               BgReserved: True/False;
               ShareSummary: cc };
  popupApp1:{ ToPopApp: xx;
              ToPopWindow: yy;
              ToPopSummary: ss;
              ToPopCoordinate: {(x1, y1),(x2, y2)};
              Urgency: 1-n;
              Correlation: 0-1;
              ToShare: True/False };
  popupApp2:{ ToPopApp: mm;
              ToPopWindow: nn;
              ToPopSummary: jj;
              ToPopCoordinate: {(x1, y1),(x2, y2)};
              Urgency: 1-e;
              Correlation: 0-1;
              ToShare: True/False };
  ...
}
ComsModel:{
  com1:{
    meetingApp:{ ShareGran: { Type: Area {value: areaValue} };
                 BgReserved: True/False; };
    popupApp1:{ ToPopApp: xx;
                ToPopCoordinate: {{x1, y1),(x2, y2)};
                ToShare: True/False };
    ...
    Priority: p1;
    Status: ready/in-use;
    Pre-ID: yy;
    ID: xx };
```

```
  com2:{
    meetingApp:{ ShareGran: { Type: Object {value: objectValue} };
                 BgReserved: True/False; }
    popupApp1:{ ToPopApp: xx;
                ToPopWindow: windowIDx;
                ToShare: True/False };
    popupApp2:{ ToPopApp: mm;
                ToPopWindow: windowIDy;
                ToShare: True/False };
    ...
    Priority: p2;
    Status: ready/in-use;
    Pre-ID: yy;
    ID: xx };
  ...
}
```

In the code, "meetingApp" is the online meeting sharing application, "ShareGran" is the current sharing granularity of meetingApp, "Bgreserved" is used to tell whether to set the sharing page before switching to new share granularity and ShareSummary includes the current sharing content summary, content tags (automatically or manually set), attendees, host, etc. In addition, "ToPopApp" is the to-be-popup application name, "ToPopWindow" is a detailed window to be popped up, "ToPopTime" is the time to make the popup window, "ToPopSummary" will include the current to-be-popup content summary, content tags (automatically or manually set), audience, sender, etc., "ToPopCoordinate" is a set of detailed coordinates to place a popup window, "Urgency" describes a degree of urgency, "ToShare" is set to describe whether something is to be shared or not, "Priority" sets a priority rank of the coms-model, "Status" sets a real-time status of a popup application (i.e., ready or in-use), "Pre-ID" sets an ID of the coms-model being replaced and "ID" sets an ID of this coms-model.

To the end, processor 204 of the computing device 201 can include the ICMM 402, the DAM 403, the SGCM 404 and the SMM 405. The ICMM 402 includes an information collection unit 4021, an information management unit 4022 and a special data structure updating unit 4023. The ICMM 402 collects information of pre-popup windows and a current conference application, takes a snapshot of a currently shared screen and uses the snapshot to cover a whole window. The DAM 403 includes a data formatting unit 4031, an urgency analysis unit 4032, a correlation analysis unit 4033 and a special data structure updating unit 4034. The DAM 403 analyzes the information and produces a primary base-model for subsequent usage. The DAM 403 uses data formatting, urgency analysis and correlation analysis to generate the primary base-model. The SGCM 404 includes a sharing granularity calculation unit 4041 and a special data structure updating unit 4042. The SGCM 404 analyzes the base-model to produce a coms-model for subsequent usage. The SGCM 404 finds hyperplanes between not-to-be-shared popup windows and the shared information of the current conference application. With proper hyperplanes determined, an optimal combination of to-be-popup applications and the current conference application with a designated sharing granularity will be produced to form a coms-model for subsequent usage. The SMM 405 includes a popup message controller unit 4051, a screen sharing controller unit 4052 and a feedback collection unit 4053. The SMM 405 triggers a switching process of granularity by maintaining the coms-model to schedule and manage the current conference application to adjust the sharing granularity and by taking advantage of "state"

attributes in the coms-model to change back to original sharing granularity after related popup messages are closed automatically or by the presenter.

Figure 5:
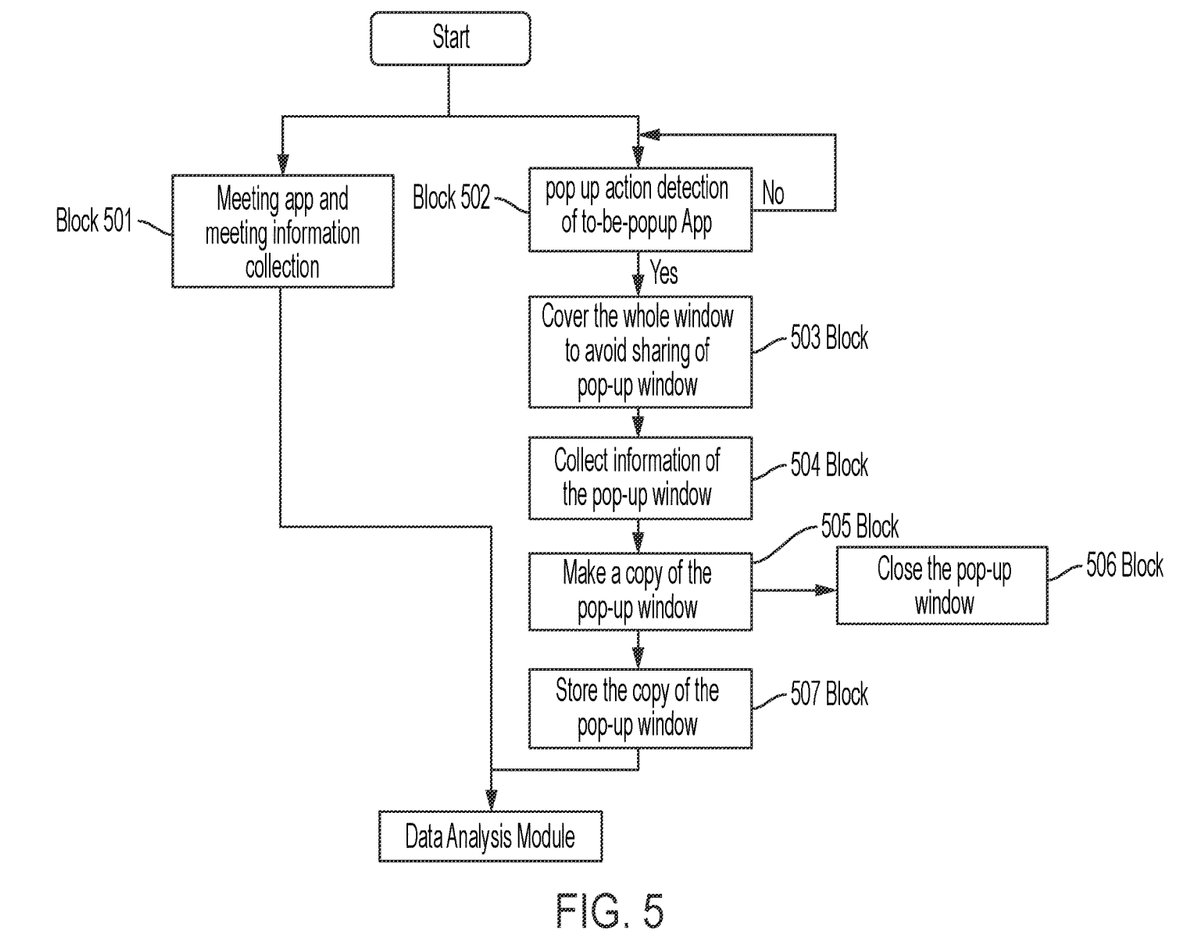
FIG. 5 is a flow diagram illustrating operations of an information collection and management module of the computing device of FIG. 2 to execute certain operations of the computer-implemented method of FIG. 3 in accordance with one or more embodiments of the present invention.

With continued reference to FIGS. 2-4 and with additional reference to FIG. 5, an operation of the ICMM 402 of FIG. 4 will now be described. As shown in FIG. 5, the ICMM 402 begins by collecting information of the web conference 200 (see FIG. 2) at block 501 and by detecting a popup action at block 502. The collected information of the web conference 200 is stored in the DAM 403 of FIG. 4. If a popup action is detected, the ICMM 402 covers a whole area of the display unit of the computing device 201 of FIG. 3 to avoid sharing information contained in the potential popup window of the detected popup action at block 503. Then, the ICMM 402 collects information of the potential popup window at block 504, makes a copy of the potential popup window at block 505, closes the potential popup window at block 506 and stores the copy at block 507 for use by the DAM 403.

The DAM 403 is configured to execute at least the operations of blocks 301, 302 and 303 (as well as blocks 3031, 3032, 3033 and 3034) of the computer-implemented method 300 of FIG. 3 to generate data tables to be used in the urgency and correlations analyses. The data tables can be provided as follows:

Summary," which are each provided as vectors A, B each representing a value of a selected attribute and a weight of a selected attribute, with a cosine similarity algorithm to determine whether a message should be shared during the screen sharing. Here, the more similar two vectors are, the smaller the included angle of the vectors is and the larger of the cosine absolute value is from 0-1 given the following equation:

$$\text{Correlation} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}}$$

The information in the base-model is updated following the operation of the DAM 402. Based on this updated information, the SGCM 404 uses a support vector machine (SVM) to find a hyperplane and thus an optimal combination of a pre-pop window and the meeting application sharing granularity can be obtained. This is then used to update the coms-model. The updated coms-model will then be used by the SMM 405 for scheduling and management of the mes-

| Attribute | Value($v_n$) | Correlation Weight($w_n$) |
|---|---|---|
| App name | Webex | 0 |
| Type | Business | 0.3 |
| Subject | Product New Feature Introduction | 0.4 |
| Participant [(role, name)] | [(Custome: Jacky), (Manager: Jim), (Teammate: Sue) . . .] | 0.4 |
| Start | 2021 Jul. 28 14:00 | 0 |
| End | 2021 Jul. 28 15:00 | 0 |
| Host | Yes/No | 0 |
| Sharing | Yes/No | 0 |
| URL | www.webex.com/meet/. . . | 0 |

| Attribute | | Value($v_n$) | Correlation Weight($w_n$) | Urgency($u_n$) | Urgency Weight($wu_n$) |
|---|---|---|---|---|---|
| App name | | Slack | 0 | — | 0 |
| Type | | Business | 0.3 | 2 | 0.1 |
| Abstract | | Send monthly report to me by this Friday | 0.4 | 3 | 0.2 |
| Sender {role, name} | | {manager: Jim} | 0.4 | 2 | 0.2 |
| Required Action | | Send work summary to me by this Friday | 0 | 3 | 0.3 |
| Severity | | 3 | 0 | 3 | 0.3 |
| Time | | 2021 Jul. 28 14:30 | 0 | — | 0 |
| Historical Reference | ToShare | False | 0 | — | 0 |
| | ShareGran | {Type: Object {value: ppt1} BgReserved: False; | | | |
| | Priority | 1 | | | |
| . . . | | . . . | . . . | . . . | . . . |

The urgency analysis can be generally based on "ToPopSummary" with a weighting algorithm to determine whether a message should be popped up during screen sharing (i.e., of the web conference 200 of FIG. 2). Up to five or more key attributes can be selected to calculate the urgency, with each attribute mapping to an urgency scale and with each attribute having a potentially unique weighted value in an urgency calculation. A threshold urgency can be set based on historic data and can be adjusted dynamically. The correlation analysis can be generally based on "ShareSummary" and "ToPopsage and the meeting application. In accordance with embodiments, the SVM can be provided as a generalized linear classifier that classifies data by a supervised learning method (see FIG. 1 and the accompanying text). A decision boundary of the SVM can be a maximum-margin hyperplane that is solved for the learning sample. Also, the sharing granularity here refers to the granularity of sharing using the meeting application, such as full-screen sharing, partial-area sharing or application sharing.

Figure 6A:
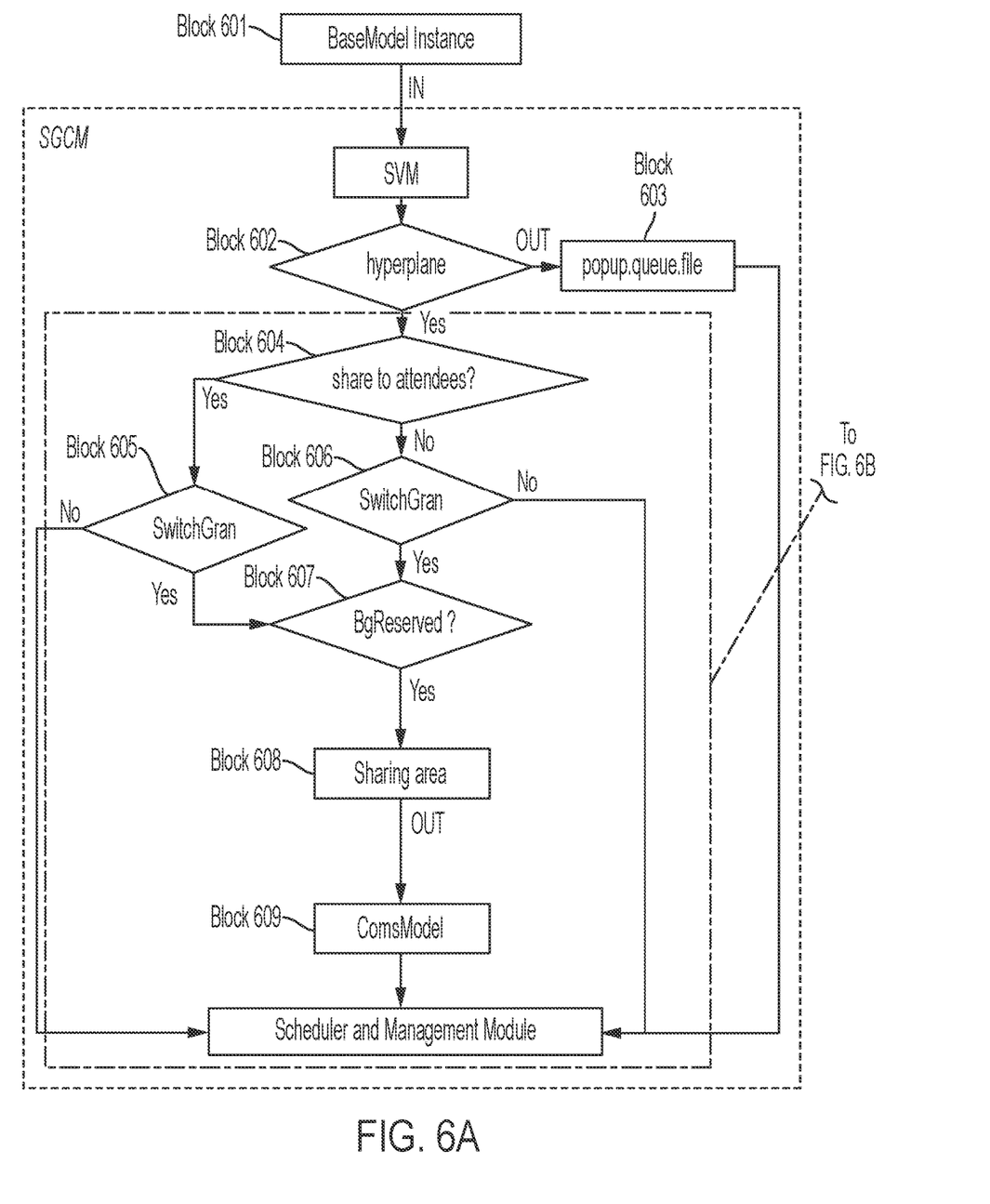
FIGS. 6A and 6B are flow diagrams illustrating operations of a sharing granularity control module of the computing device of FIG. 2 to execute certain operations of the computer-implemented method of FIG. 3 in accordance with one or more embodiments of the present invention.

With continued reference to FIGS. 2-4 and with additional reference to FIGS. 6A and 6B, an operation of the SGCM 404 of FIG. 4 will now be described. As shown in FIG. 6A, the SGCM 404 begins by receiving a base-model instance at block 601 and by using the SVM to find the hyperplane at block 602. The hyperplane is used to generate a popup queue file at block 603 which is communicated to the SMM 405. The SGCM 404 then determines whether to share with the attendees at block 604. If so or if not, the SGCM 404 determines whether to switch granularity at block 605, 606. If no granular switch is called for, the SGCM 404 communicates the determinations to the SMM 405. If a granular switch is called for, the SGCM 404 determines whether BgReserved is true at block 607, defines a sharing area at block 608, updates the coms-model at block 609 and communicates this with the SMM 405.

Figure 6B:
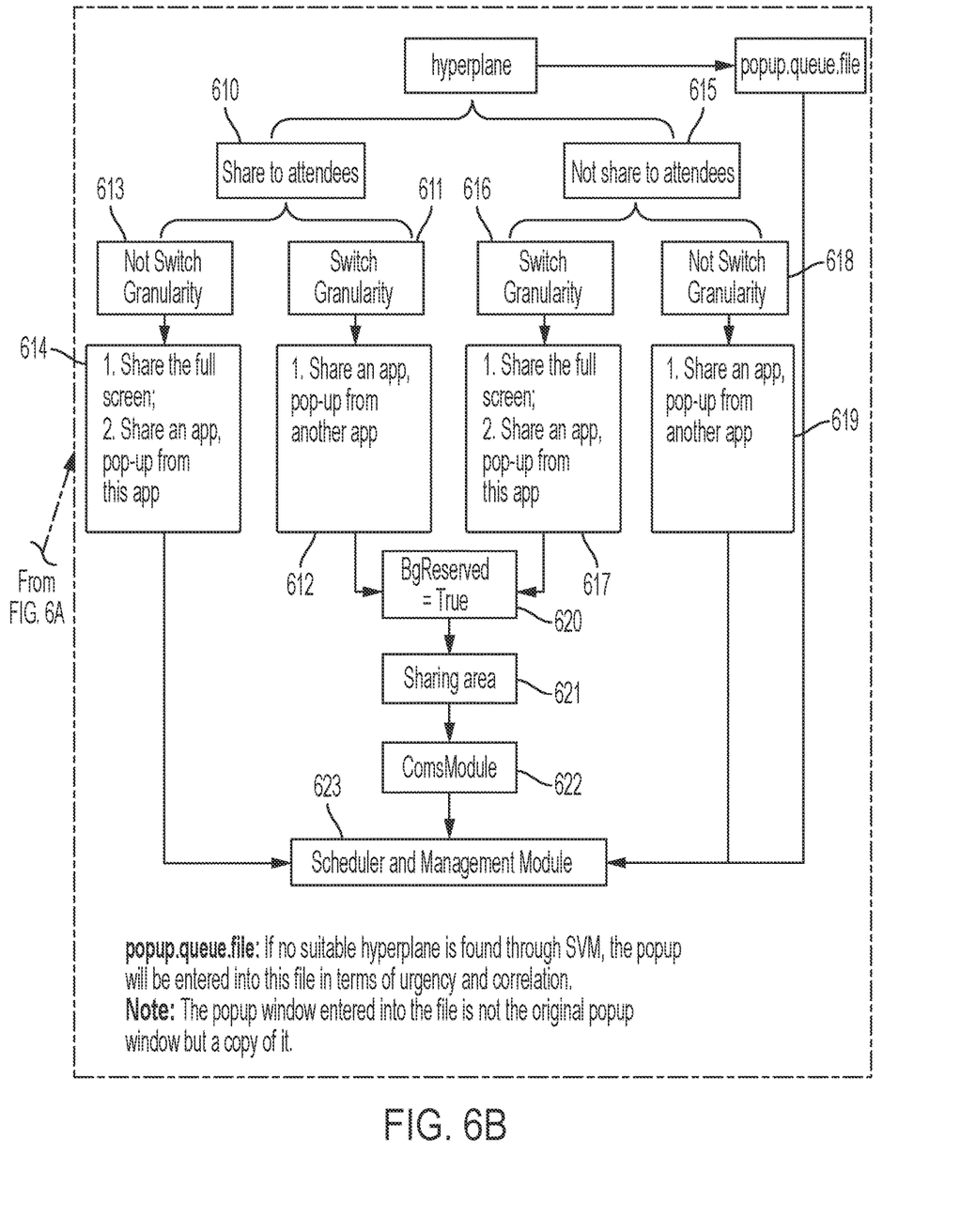

As shown in FIG. 6B, once the hyperplane is found at block 602 of FIG. 6A, a series of decisions are made as to whether to share to attendees 610 and whether to switch granularity 611 and thus to share an application popup from another application 612 or not to switch granularity 613 and thus to share a full screen or share an application popup from a current application 614 or not to share to attendees 615 and whether to switch granularity 616 and thus to share a full screen or share an application popup from a current application 617 or not to switch granularity 618 and thus to share an application popup from another application 619. In an event a decision is made to share to attendees 610 and to switch granularity 611 and thus to share an application popup from another application 612 or not to share to attendees 615 and to switch granularity 616 and thus to share a full screen or share an application popup from a current application 617, a determination is made as to whether BgReserved is True at 620, a sharing area is determined at 621, the Coms-model is engaged at 622 and the SMM is engaged at 623. Alternatively, in an event a decision is made to share to attendees 610 and not to switch granularity 613 and thus to share a full screen or share an application popup from a current application 614 or not to share to attendees 615 and not to switch granularity 618 and thus to share an application popup from another application 619, the SMM is engaged at 623.

The SMM 405 of FIG. 4 schedules and manages meeting or web conference applications to adjust a sharing granularity. When a new coms-model arrives, the SMM 405 adjusts the sharing granularity by changing a status of a currently displayed coms-model to "ready", changing a status of a corns-model to be displayed to "in-use" and recording the "Pre-ID" of the corns-model in the "in-use" status. When the new coms-model has been consumed, the SMM 405 restores the sharing granularity by changing a status of a currently displayed coms-model to "ready", changing a status of a corns-model with "ID" as "Pre-ID" of the just-consumed corns-model from "ready" to "in-use" and recording the "Pre-ID" of the corns-model in the "in-use" status. The SMM 405 can receive user input for feedback and improvement of its algorithms.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
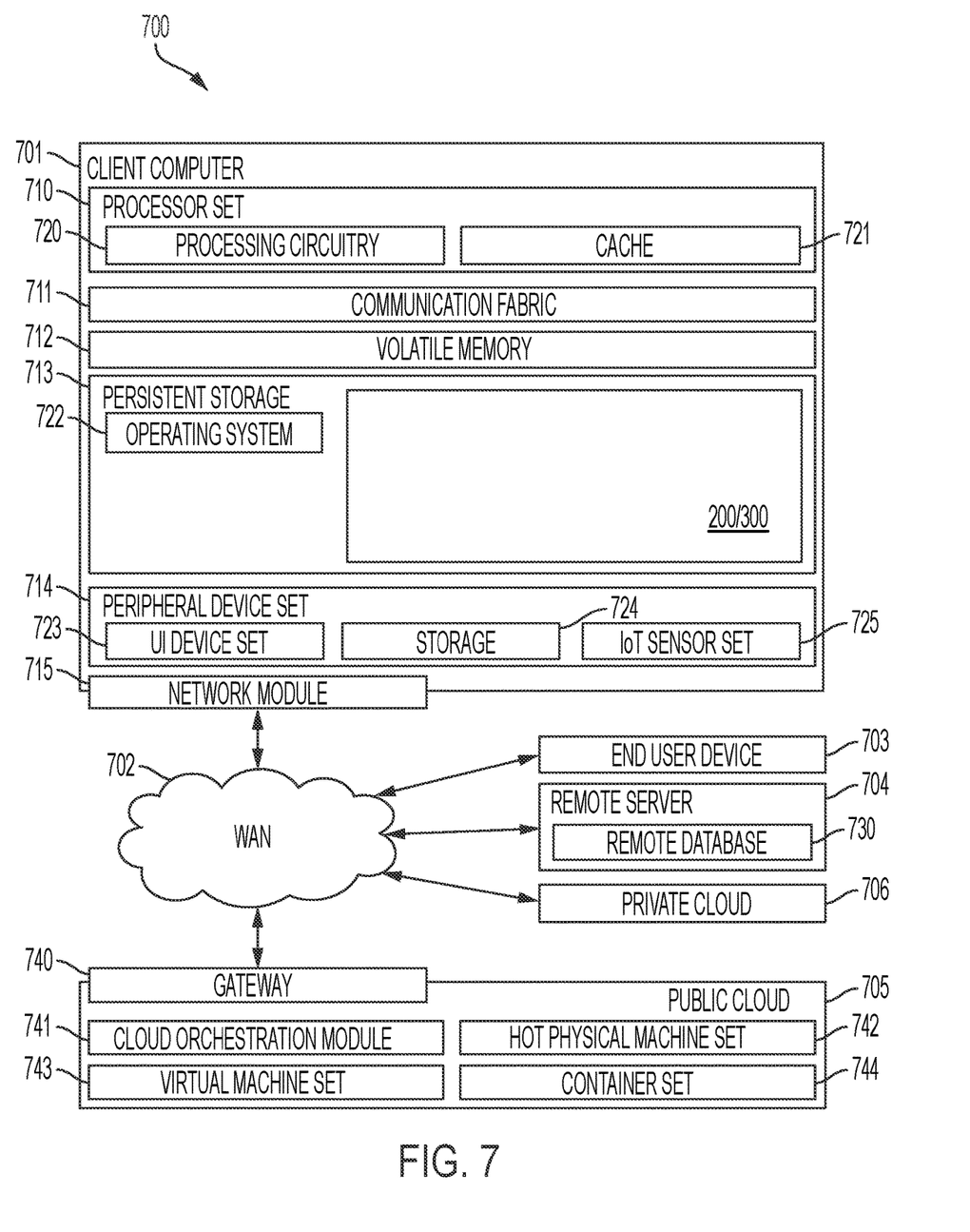
FIG. 7 is a schematic diagram of a computing environment for implementing one or more embodiments of the present invention.

With reference to FIG. 7, a computer or computing device 700 that implements the computer-implemented method 100 of FIG. 1 and the computer-implemented method of FIGS. 2 and 3 in accordance with one or more embodiments of the present invention is provided. The computing system of FIG. 7 contains an example of an environment for the execution of at least some of the computer code involved in performing the inventive methods, such as the block of the computer-implemented method 200 of FIG. 2 for managing information during a web conference. In addition to the computer-implemented method 200, the computing system 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and the computer-implemented method 200, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

The computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of the computer-implemented method 200, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

The processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In the computer-implemented method 200, at least some of the instructions for performing the inventive methods may be stored in the block of the computer-implemented method 200 in persistent storage 713.

Communication fabric 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in the block of the computer-implemented method 200 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for managing information during a web conference, the computer-implemented method comprising:
   collecting and formatting meeting application information at a processor of a computing device having a screen being shared with attendees of the web conference;
   collecting and formatting to-be-popup application information at the processor;
   analyzing, by the processor, an urgency of the to-be-popup application information and a correlation between the to-be-popup application information and the meeting application information;
   determining, by the processor, to share the to-be-popup application information with a user of the computing device and with the attendees based on results of the analyzing; and
   sharing the to-be-popup application information with the user of the computing device and one or more of the attendees in accordance with affirmative results of the determining with respect to the user and the one or more of the attendees, wherein:
   the computer-implemented method further comprises finding, from a base model, a hyperplane between not-to-be-shared popup windows and shared information of the meeting application and using the hyperplane to generate a popup queue file in which collected and formatted to-be-popup application information is stored,
   the sharing of the to-be-popup application information with the user of the computing device and the attendees comprises determining how and when to share the to-be-popup application information with the user of the computing device and the attendees, and
   the determining of how and when to share the to-be-popup application information with the user of the computing device and the attendees comprises determining to switch a granularity of a screen, and
   in an event a determination is made to switch the granularity of the screen, the computer-implemented method further comprises determining a sharing area of the screen with a background reserved condition being true and sequentially updating a coms-module, which is based on the base model, with an optimal combination of to-be-popup applications and the meeting application with a designated sharing granularity to form the coms-module for subsequent usage and engaging a scheduler and management module (SMM) to use the coms-module for the subsequent usage.

2. The computer-implemented method according to claim 1, wherein the analyzing of the urgency comprises:
   assigning an urgency score to the to-be-popup application information, which describes the urgency thereof; and
   determining that the urgency score exceeds a historically set and dynamically updatable urgency threshold.

3. The computer-implemented method according to claim 1, wherein the analyzing of the correlation comprises:
   assigning a correlation score to the to-be-popup application information, which describes the correlation between the to-be-popup application information and the meeting application information; and
   determining that the correlation score exceeds a historically set and dynamically updatable correlation threshold.

4. A computer program product for managing information during a web conference, the computer program product comprising one or more computer readable storage media having computer readable program code collectively stored on the one or more computer readable storage media, the computer readable program code being executed by a processor of a computer system to cause the computer system to perform a method comprising:
   collecting and formatting meeting application information at a processor of a computing device having a screen being shared with attendees of the web conference;
   collecting and formatting to-be-popup application information at the processor;
   analyzing, by the processor, an urgency of the to-be-popup application information and a correlation between the to-be-popup application information and the meeting application information;
   determining, by the processor, to share the to-be-popup application information with a user of the computing device and with the attendees based on results of the analyzing; and
   sharing the to-be-popup application information with the user of the computing device and one or more of the attendees in accordance with affirmative results of the determining with respect to the user and the one or more of the attendees, wherein:
   the computer-implemented method further comprises finding, from a base model, a hyperplane between not-to-be-shared popup windows and shared information of the meeting application and using the hyperplane to generate a popup queue file in which collected and formatted to-be-popup application information is stored, the sharing of the to-be-popup application information with the user of the computing device and the attendees comprises determining how and when to share the to-be-popup application information with the user of the computing device and the attendees, and
   the determining of how and when to share the to-be-popup application information with the user of the computing device and the attendees comprises determining to switch a granularity of a screen, and
   in an event a determination is made to switch the granularity of the screen, the computer-implemented method further comprises determining a sharing area of the screen with a background reserved condition being true and sequentially updating a coms-module, which is based on the base model, with an optimal combination of to-be-popup applications and the meeting application with a designated sharing granularity to form the coms-module for subsequent usage and engaging a scheduler and management module (SMM) to use the coms-module for the subsequent usage.

5. The computer program product according to claim 4, wherein the analyzing of the urgency comprises:
assigning an urgency score to the to-be-popup application information, which describes the urgency thereof; and
determining that the urgency score exceeds a historically set and dynamically updatable urgency threshold.

6. The computer program product according to claim 4, wherein the analyzing of the correlation comprises:
assigning a correlation score to the to-be-popup application information, which describes the correlation between the to-be-popup application information and the meeting application information; and
determining that the correlation score exceeds a historically set and dynamically updatable correlation threshold.

7. A computing system comprising:
a processor; a memory coupled to the processor; and one or more computer readable storage media coupled to the processor, the one or more computer readable storage media collectively containing instructions that are executed by the processor via the memory to implement a method comprising:
collecting and formatting meeting application information at a processor of a computing device having a screen being shared with attendees of the web conference;
collecting and formatting to-be-popup application information at the processor;
analyzing, by the processor, an urgency of the to-be-popup application information and a correlation between the to-be-popup application information and the meeting application information;
determining, by the processor, to share the to-be-popup application information with a user of the computing device and with the attendees based on results of the analyzing; and
sharing the to-be-popup application information with the user of the computing device and one or more of the attendees in accordance with affirmative results of the determining with respect to the user and the one or more of the attendees, wherein:
the computer-implemented method further comprises finding, from a base model, a hyperplane between not-to-be-shared popup windows and shared information of the meeting application and using the hyperplane to generate a popup queue file in which collected and formatted to-be-popup application information is stored,
the sharing of the to-be-popup application information with the user of the computing device and the attendees comprises determining how and when to share the to-be-popup application information with the user of the computing device and the attendees, and
the determining of how and when to share the to-be-popup application information with the user of the computing device and the attendees comprises determining to switch a granularity of a screen, and
in an event a determination is made to switch the granularity of the screen, the computer-implemented method further comprises determining a sharing area of the screen with a background reserved condition being true and sequentially updating a coms-module, which is based on the base model, with an optimal combination of to-be-popup applications and the meeting application with a designated sharing granularity to form the coms-module for subsequent usage and engaging a scheduler and management module (SMM) to use the coms-module for the subsequent usage.

8. The computing system according to claim 7, wherein:
the analyzing of the urgency comprises assigning an urgency score to the to-be-popup application information, which describes the urgency thereof and determining that the urgency score exceeds a historically set and dynamically updatable urgency threshold, and
the analyzing of the correlation comprises assigning a correlation score to the to-be-popup application information, which describes the correlation between the to-be-popup application information and the meeting application information and determining that the correlation score exceeds a historically set and dynamically updatable correlation threshold.

\* \* \* \* \*